Aug. 5, 1941.   C. SAURER   2,251,809
RESILIENT WHEEL
Filed Nov. 6, 1940
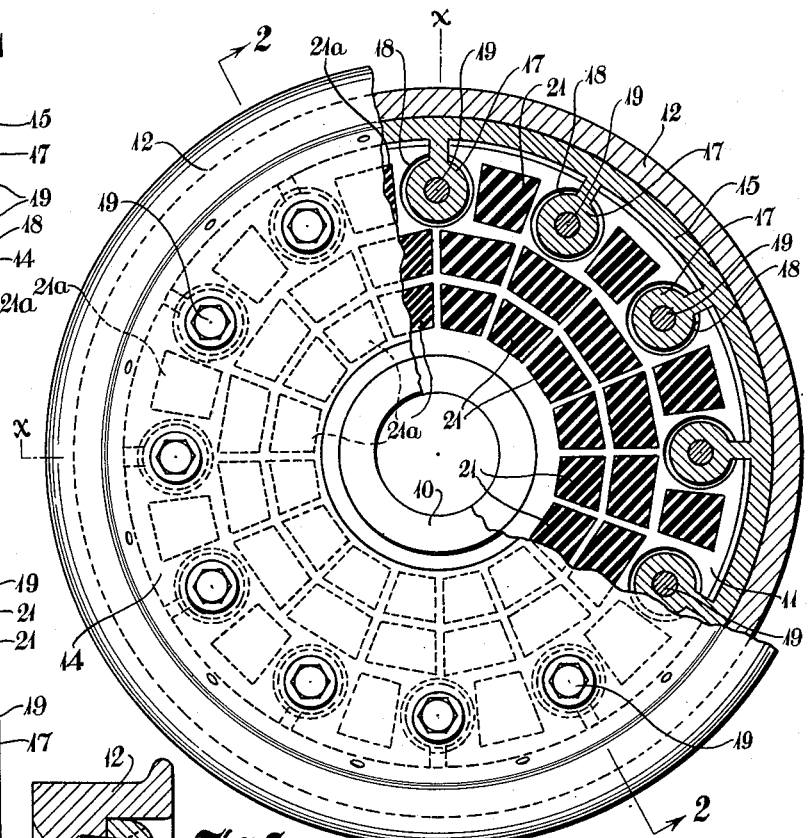
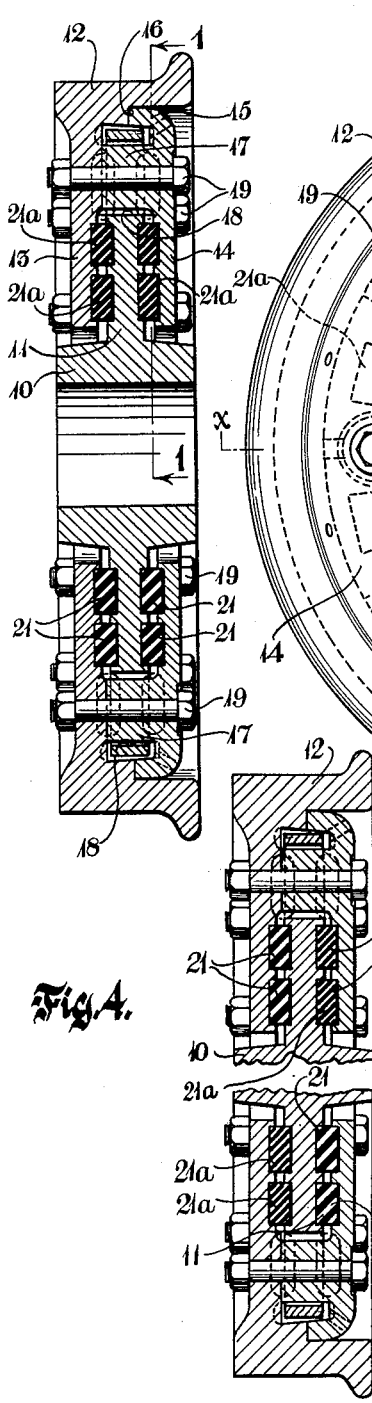
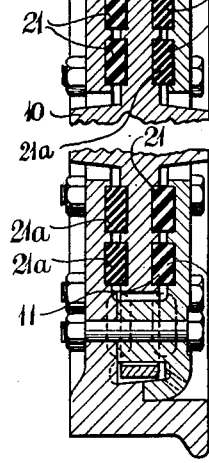
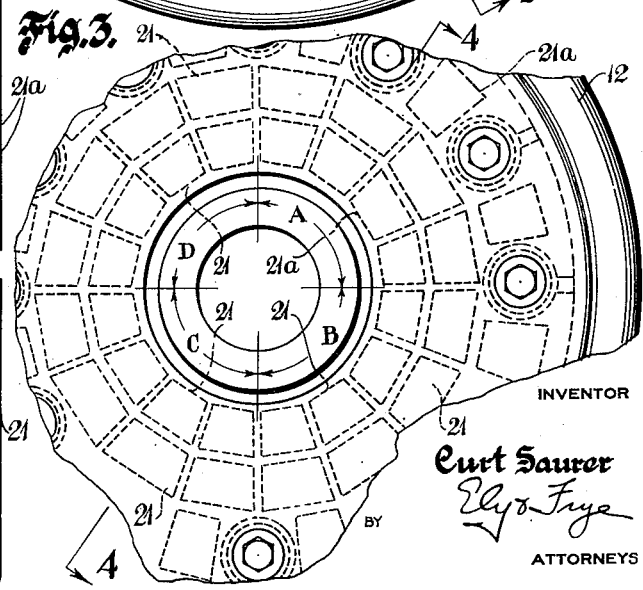
INVENTOR
Curt Saurer
BY
ATTORNEYS Patented Aug. 5, 1941

2,251,809

UNITED STATES PATENT OFFICE 2,251,809

RESILIENT WHEEL

Curt Saurer, Akron, Ohio, assignor to The Firestone Tire & Rubber Company, Akron, Ohio, a corporation of Ohio Application November 6, 1940, Serial No. 364,503

8 Claims. (Cl. 295—11)

This invention relates to resilient wheels for vehicles, and more especially it relates to improvements in resilient wheels for vehicles such as street cars and railway cars that travel upon permanent trackways.

The invention is an improvement upon the vehicle wheel constituting the subject matter of my co-pending application for Letters Patent, Serial No. 178,085, filed December 4, 1937.

Car wheels that run upon rails set up definite traction noises, which noises include shrill screeches when the trackway passes about a curve. This is especially true when the curve is of relatively short radius, as in the case of street car tracks on city streets. Traction squeals generated by street cars on curves are due to friction between the tracks and car wheels as one of the latter slips relatively of the track as the result of the shorter track-length on the inside of the curve. To a lesser extent such squeals also may be induced by friction of a wheel-flange against a rail. Such friction sets up vibration of the car wheels and thus produces the traction noise mentioned, such noise being amplified and heightened in pitch by resonance induced by periodic vibration of the wheels. Experience has shown that resilient wheels comprising cushioning elements of rubber or the like are substantially as productive of objectional traction squeals as are wheels composed entirely of metal.

Accordingly it is the chief objects of this invention to provide an improved resilient vehicle wheel of the character mentioned that will not generate traction noises, especially on curves, to the extent of prior art wheels; and to provide improved resilient wheels of the character mentioned without sacrifice of riding comfort. Other objects will be manifest as the description proceeds.

On the accompanying drawing:

Figure 1 is a front elevation of a resilient wheel constituting one embodiment of the invention, a part thereof being broken away and in section on line 1—1 of Figure 2;

Figure 2 is a section on the line 2—2 of Figure 1;

Figure 3 is a fragmentary front elevation of a wheel constituting another embodiment of the invention; and Figure 4 is a section on the line 4—4 of Figure 3.

Referring to Figures 1 and 2 of the drawing, 10 is the hub of a rail wheel, 11 is a relatively wide circumferential flange extending radially outwardly therefrom midway between the ends thereof, 12 is the metal tire of the wheel, and 13 is a circumferential flange extending radially inwardly from the inner circumference thereof, and from adjacent one of the lateral faces of the tire. In the assembled structure the said hub flange 11 and the tire flange 13 are disposed in parallel planes but are axially spaced apart from each other, the said tire flange encircling the hub but having substantial clearance thereabout, and the tire 12 encircling the hub flange 11 in spaced relation thereto. Secured to the tire flange 13 is an annular cap plate 14 that is disposed parallel to the hub flange 11 and said tire flange, the outer peripheral portion of said cap plate being formed with an axially extending flange 15 that abuts a shoulder or seat 16 formed on the inner circumference of the tire 12. The inner circumference of the cap plate 14 encircles the hub 10 but has substantial clearance thereabout. The arrangement is such that the hub flange 11 is positioned between the tire flange 13 and the cap plate 14 in laterally spaced relation to both of them. The inner lateral face of the cap plate 14 is formed, near its outer circumference, with a series of bosses 17, 17 that extend through respective apertures 18, formed in the hub flange 11, and abut the inner lateral face of the tire flange 13. The cap plate is secured to the latter by means of bolts 19, 19 that extend through the bosses 17 at the respective axes of the latter. The apertures 18 normally are concentric with the axes of the respective bosses, and are of such size as to have a fraction of an inch clearance about the perimeters of the bosses, the arrangement being such as enable limited movement of the hub structure relatively of the tire structure both radially and angularly, as presently will be explained.

Positioned upon each side of the hub flange 11, between the latter and the tire flange 13 and cap plate 14 respectively, are a plurality of concentric series of resilient blocks or elements, herein shown as three in number although a greater or lesser number may be provided if desired. The said blocks or elements, which are designated 21 and 21a, are essentially similar in function, shape, and arrangement, but differ in degree of resilience as hereinafter will be explained. The blocks 21, 21a are symmetrically arranged about the axis of the wheel, but the blocks of the outer series are fewer in number and somewhat offset from the blocks of the two inner series because of the presence of the bolts 19. Preferably the blocks 21, 21a are trapezoidal in shape since this shape enables the use of the greatest number of blocks, but blocks of other shape may be employed under some conditions, if desired. For retaining the blocks 21, 21a properly in position, the opposite lateral faces of the hub flange 11 and the adjacent lateral faces of the tire flange 13 and cap plate 14 are formed with shallow recesses that are of the same profile as the respective blocks, and in which minor portions of the latter are received. The blocks 21, 21a which preferably are composed of vulcanized rubber, are of such thickness that they are placed under substantial compressive stress when the cap plate 14 is forced into the position illustrated by the setting up of the bolts 19. Because of the compression of the blocks 21, 21a in the direction of the axis of the wheel, they strongly resist relative axial movement between the hub 10 and the tire 12, thereby obviating side sway of the vehicle.

It will be seen that the hub structure is floating, normally being supported by the tire structure entirely through the agency of the rubber elements. The arrangement is such that relative movement of the hub structure radially of the tire structure yieldingly is opposed by all of the resilient elements by reason of their resistance to shear and deformation. Before relative radial movement between the hub structure and tire structure becomes great enough to impose destructive strain upon the resilient elements, the margins of all of the apertures 18 of the hub flange 11 will come into contact with the respective bosses positioned in said apertures, with the result that further relative radial movement of the hub and tire structures is prevented.

As previously stated, the blocks 21 and 21a are of different degrees of resilience. For example, blocks 21 of 70 durometer hardness and blocks 21a of 50 durometer hardness have been found to give satisfactory results in most cases. The blocks 21a are fewer in number than the blocks 21, and are disposed entirely within a local sector of the tire, which sector is defined by the radial lines X, X of Figure 1. As shown, the said sector is a quadrant, that is, it is 90° in extent, but this figure is not critical and the sector may be somewhat larger or smaller than a quadrant if desired. The quadrant of blocks 21a on one side of the hub flange 11 is coincident with the quadrant of blocks 21a on the other side of flange 11, as shown in Figure 2.

In operation, when the improved resilient wheel is subjected to peripheral friction that sets up vibration therein, such vibration will be translated to other parts of the wheel through the agency of the resilient blocks 21, 21a. Said blocks however, being of different durometer hardness, do not transmit vibration with the same facility, with the result that the sounds or noises produced by vibrations transmitted through said blocks will be of different pitch. Furthermore, due to the asymmetrical arrangement of the blocks 21, 21a, periodic vibration and noises are obviated and resonance is prevented. For this reason the improved resilient wheel will be much quieter in service than resilient wheels or solid metal wheels heretofore provided.

Since relative movement of the hub structure radially of the tire structure is opposed at all times by all of the yielding elements 21, 21a, there is but slight difference in elevation of the axle of a vehicle when the quadrant of blocks 21a is at the top of the wheel and when it is at the bottom of the wheel. Furthermore, due to rotation of the wheel, said quadrant moves progressively between its upper and lower positions, so that any variation in the height of the axle of the vehicle is accomplished smoothly and without jar, so as to be un-noticeable by riders in the vehicle.

The invention results in appreciable reduction of noise and achieves the other objects set out in the foregoing statement of objects.

In the embodiment of the invention shown in Figures 3 and 4, the various elements of the wheel structure are identical with those of the previously described embodiment of the invention, the difference residing solely in the positioning of the resilient elements of different durometer hardness. As shown in Figure 3, the wheel may be divided into four quadrants that are designated A, B, C, and D, respectively. To proportion of rubber blocks 21 to blocks 21a is the same as provided in the previously described embodiment, but the blocks 21a on one side of the hub flange 11 are disposed in a diametrically opposite quadrant to those on the other side of said hub flange. As is clearly shown in Figure 4, the blocks 21a on one side of the wheel are disposed in quadrant A, whereas those on the other side of the wheel are disposed in quadrant C. The resilient blocks 21 are positioned in the remainder of the quadrants. This embodiment of the invention functions equally as well as the embodiment first described and utilizes the same rubber and metal parts.

Other modification may be resorted to without departing from the spirit of the invention or the scope thereof as defined by the appended claims, it being essential only to provide such asymmetric arrangement of the resilient elements of the wheel as to preclude resonance of sound vibration.

What is claimed is:

1. A resilient wheel of the character described comprising resilient elements of different degrees of resilience, said elements being asymmetrically arranged in the wheel.

2. A resilient wheel of the character described comprising a circumferential series of resilient elements, said elements being of different degrees of resilience in different sectors of the wheel.

3. A resilient wheel of the character described comprising a circumferential series of resilient elements, said elements being of one degree of hardness in one quadrant of the wheel and of a different degree of hardness in the other three quadrants of the wheel.

4. A resilient wheel of the character described comprising a hub structure formed with a radially outwardly extending flange, a tire structure concentric therewith having radially inwardly extending portions disposed on opposite sides of said flange in spaced relation thereto, and respective circumferential series of resilient elements disposed between said flange and each tire portion at the sides thereof, the resilient elements of each series comprising elements of different degrees of hardness, the elements of like hardness in one series being offset from the elements of the same hardness in the other series.

5. A resilient wheel of the character described comprising a hub structure formed with a radially outwardly extending flange, a tire structure concentric therewith having radially inwardly extending portions disposed on opposite sides of said flange in spaced relation thereto, and respective circumferential series of resilient elements disposed in the spaces between said hub flange and the tire portions at each side thereof, the resilient elements of each series being of different degrees of hardness with the elements of like hardness arranged in the same sector of the wheel, the sectors of like hardness in the two series being arranged in diametrically opposed relation to each other.

6. A resilient wheel of the character described comprising a hub structure, a tire structure concentric therewith, a radially extending formation on one of said structures disposed between a pair of radially extending formations integral with the other structure, and respective circumferential series of rubber blocks disposed between the radially extending hub and tire formations, each series of blocks comprising blocks of different degrees of hardness, the blocks of same hardness being localized in different sectors of the wheel, the sectors of blocks of like hardness in one series of blocks being offset from the sectors of blocks of like hardness in the other series.

7. A resilient wheel of the character described comprising a hub structure formed with a radially outwardly extending flange, a tire structure concentric therewith having radially inwardly extending portions disposed on opposite sides of said flange in spaced relation thereto, and respective circumferential series of resilient elements disposed between said flange and each tire portion at the sides thereof, the resilient elements of each series comprising elements of different degrees of hardness, the elements of like hardness in one series being coincident with the elements of same hardness in the other series.

8. In a resilient wheel for rail vehicles, the combination of a hub structure having a radially outwardly extending flange, a tire structure concentric with said hub structure, said tire structure having a radially inwardly extending flange disposed laterally of said hub flange in spaced relation thereto, a cap plate associated with and laterally spaced from the axially outer surface of one of said flanges with the inner of said flanges being sandwiched between said cap plate and the outer of said flanges, a plurality of small resilient elements disposed in spaced apart relation between the adjacent lateral faces of said flanges and between the axially inner surface of said cap plate and the axially outer surface of said inner flange, and means extending between and normally engaging with only said cap plate and said outer flange for drawing them laterally towards each other to compress said resilient elements between said outer and inner flanges and between said cap plate and said inner flange, said resilient elements being of different degrees of resilience in different sectors of the wheel.

CURT SAURER.